J. E. BARROWS.
TRANSMISSION CHAIN.
APPLICATION FILED MAR. 19, 1918.
1,304,933.
Patented May 27, 1919.
3 SHEETS—SHEET 2.
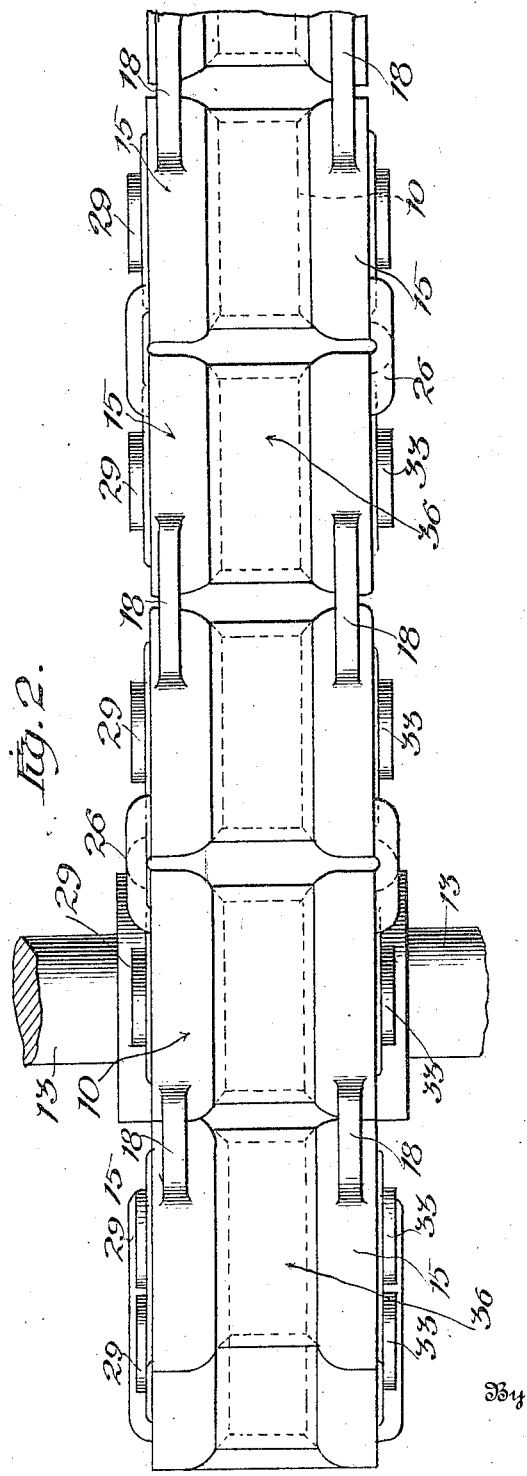
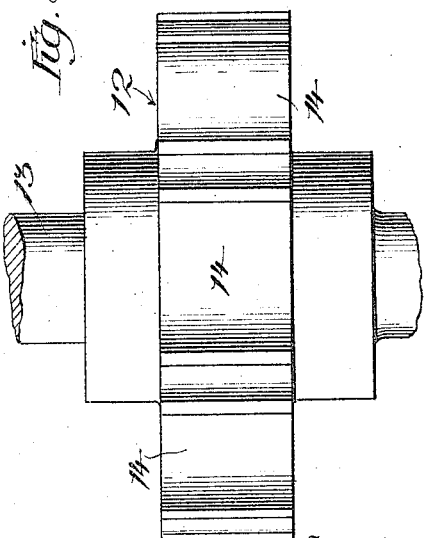
Inventor
J. E. Barrows.
By
Attorneys

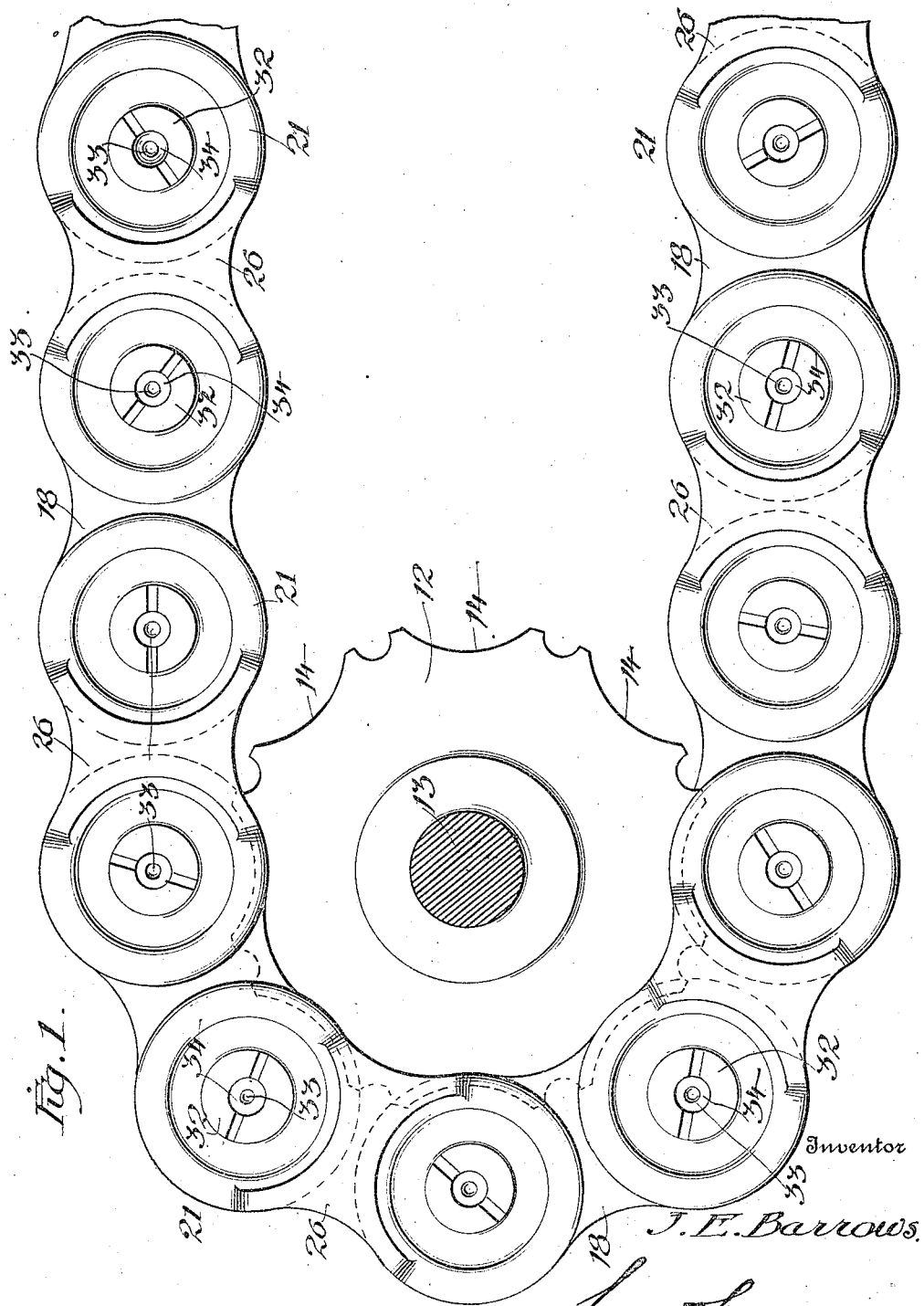

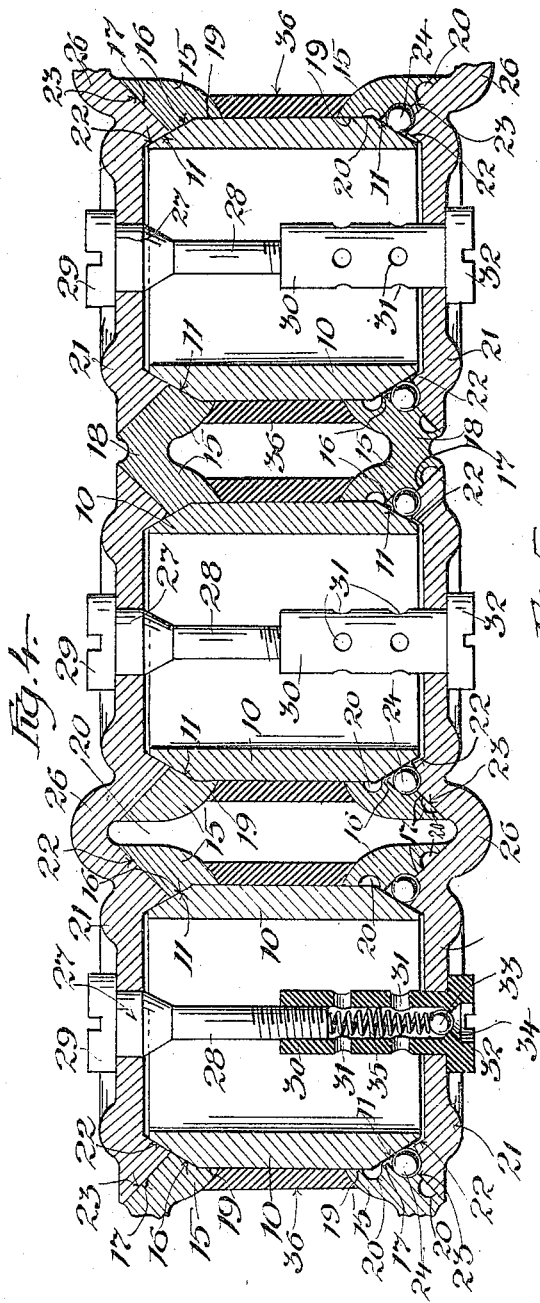 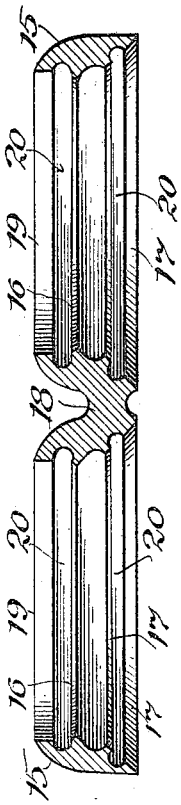 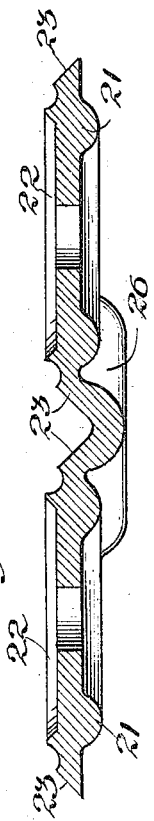

UNITED STATES PATENT OFFICE.

JOHN E. BARROWS, OF WENATCHEE, WASHINGTON.

TRANSMISSION-CHAIN.

1,304,933.　　　　　　Specification of Letters Patent.　　Patented May 27, 1919.

Application filed March 19, 1918. Serial No. 223,395.

*To all whom it may concern:*

Be it known that I, JOHN E. BARROWS, a citizen of the United States, residing at Wenatchee, in the county of Chelan and State of Washington, have invented certain new and useful Improvements in Transmission-Chains, of which the following is a specification.

This invention relates to improvements in power transmitting chains, and has for one of its objects to increase the efficiency and utility of devices of this character.

Another object of the invention is to provide a device of this character in which friction between the parts is reduced to a minimum, and means provided for deadening the sound without decreasing the efficiency.

Another object of the invention is to provide a device of this character including a plurality of coacting links mounted to swing upon cylindrical bearing blocks or units and with means whereby the bearing surfaces are automatically lubricated.

With these and other objects in view, the invention consists in certain novel features of construction, as hereinafter shown and described and then specifically pointed out in the claims; and in the drawings illustrative of the preferred embodiment of the invention—

Figure 1 is a side elevation of a portion of the improved chain mounted upon one of the carrier devices.

Fig. 2 is a plan view of the parts shown in Fig. 1.

Fig. 3 is a plan view of one of the carrier members.

Fig. 4 is an enlarged longitudinal section of a plurality of the chain units illustrating the construction.

Fig. 5 is an enlarged longitudinal section of one of the inner links.

Fig. 6 is a longitudinal section of one of the outer links.

The improved device comprises a plurality of cylindrical bearing blocks or units having annular conical faces at their ends, a plurality of inner links having inner conical faces adapted to engage portions of the adjacent conical faces of the blocks or units and also having outer conical faces, outer links having inner conical faces adapted to engage the remaining portions of the conical faces of the blocks and also having outer conical faces engaging against the outer conical faces of the inner links, and tension pin devices uniting the outer links to the blocks.

The cylindrical bearing blocks or units constitute the cores or body portions of the improved chain and are designed to coact with semicircular recesses in the rims or peripheries of suitable carrier members, so that as the carrier members are rotated, the chain is caused to travel thereover and transmit motion from the shaft of the carrier, or to transmit power to the shaft, as the case may be, the carriers, one of which is indicated at 12, being mounted for rotation with or attached to the shaft 13, as may be required.

The cylindrical bearing blocks or units are precisely alike and a description of one will suffice for all. The blocks are represented as a whole at 10 and are open at the ends and each formed with terminal conical faces 11.

If the carrier 12 is to rotate as an idler, it will be mounted loosely upon its shaft 13, but if the motion of the carrier is to be imparted to the shaft, the carrier will be rigidly coupled to the shaft. The periphery of the carrier is formed with a plurality of curved recesses 14, the recesses being spaced at intervals corresponding to the distance between the centers of the blocks 10 so that the blocks coact one after the other with the recesses, as hereafter described.

The inner links are indicated as a whole at 15 and are each constructed as more clearly shown in Figs. 4 and 5. Each inner link engages two of the blocks and is formed with inner conical faces 16 disposed at equal distances from the center of the link and also with outer conical faces 17. The conical faces 16 bear upon the inner portions of the conical faces 11 of the contiguous pair of the blocks 10, while the conical faces 17 are directed substantially at right angles to the conical faces of the blocks. The body portions of the inner links 15 are connected by web portions 18 which overlap the cylindrical outer faces of the blocks 10 for a short distance as shown at 19, and bear against the opposite ends of the blocks as illustrated in Fig. 4.

The outer links are indicated as a whole at 21 and are each formed with inner conical faces 22 corresponding to the conical faces 16 of the inner links, and bearing over the outer portions of the conical faces 11 of the blocks, and also with outer conical faces 23 corresponding to and bearing against the conical faces 17 of the inner links. The confronting faces 17—23 at one side of the chain are provided with annular seats to receive anti-friction bearing balls 24 as shown in Fig. 4. The outer links are connected by outwardly curving webs 26. Each of the outer links 21 at one side is bored to receive the enlarged portion 27 of a pin 28, the latter having a laterally extended head 29 to bear against the contiguous face of the link, and threaded at the inner end.

Each of the outer links at the opposite side is bored to receive a hollow sleeve 30 internally threaded at the inner end to receive the threaded terminal of the pin 28 and provided with a plurality of oil escape apertures 31. The outer end of each sleeve 30 is formed with a laterally directed head 32 adapted to bear against the outer face of the adjacent link. Each sleeve is also formed with an internal valve seat to receive a valve, preferably in ball shape as shown at 33, and with an opening 34 leading through the head 32. A spring 35 bears between the inner end of the pin 28 and the valve 33 to hold the latter yieldably on its seat.

The enlarged portions 27 of the pins 28 correspond to the diameter of the sleeves 30 so that the pins and sleeves are interchangeable.

The outer links being precisely alike at each side of the chain and the inner links being also precisely alike, may be interchangeable at will.

The interiors of the members 10 are designed to hold a supply of lubricating material, which is retained therein by the valves 33. The cylindrical units 10 may be recharged with oil by inserting a suitable implement to unseat the valves 33 and permit the oil to flow into the sleeves and thence through the ducts 31 into the cylindrical units or blocks, and when the can nozzle is withdrawn, the springs 35 will automatically close the valves and prevent the escape of the oil.

The springs 35 are enlarged intermediate their ends to completely fill the bores of the sleeves.

The annular channels 20 provide means for the passage of the oil to all of the movable faces and also prevent the escape of surplus oil.

Surrounding each block or unit 10 between the confronting faces of the inner links is an annular wear member or gasket 36, the edges of the wear members bearing over the adjacent portions of the inner links. The members 36 engage directly in the recesses 14 of the carrier 12, and thus not only receive the impact as the chain is operated, to reduce the friction between the carrier and links, but likewise prevent sound and vibration, and render the chain practically noiseless in operation. While the bearing balls and annular seats therefor are shown in Fig. 4 on one side of the chain only, it will, of course, be understood that said seats and bearing balls may be arranged on both sides of the chain if desired, or both sides of the chain may be formed with cone bearings of the construction shown at the upper portion of Fig. 4 without departing from the spirit of the invention.

Having thus described the invention, what is claimed as new is:

1. A transmission chain comprising a plurality of cylindrical units having conical faces at the ends and adapted to engage a carrier device, inner links having openings formed with inner conical faces to engage the inner portions of the conical faces of the units and with outer conical faces, outer links having inner conical faces to engage the outer portions of the conical faces of the units and also having outer conical faces to engage the outer conical faces of inner links, and means operating through the cylindrical units for connecting the outer links.

2. A transmission chain comprising a plurality of hollow units adapted to contain a lubricant and having outer conical faces, inner links having openings formed with inner conical faces to engage the conical faces of the hollow units and with outer conical faces, outer links having openings formed with inner conical faces to engage the outer conical faces of the inner links, means for supplying lubricant through the outer links into the hollow units, and means for connecting said outer links.

3. A transmission chain comprising a plurality of cylindrical units adapted to engage a carrier device and having outer conical faces, inner links having openings formed with inner conical faces to engage the conical faces of the cylindrical units and with outer conical faces, outer links having outer conical faces to engage the outer conical faces of the inner links and inner conical faces to engage the conical faces of the cylindrical units, and means for uniting the outer links.

4. A transmission chain comprising a plurality of cylindrical units, inner links rotative relatively to the cylindrical units, outer links rotative relatively to the inner links and to the cylindrical units and closing the ends of the same, means for connecting the outer links, and wear members upon the cylindrical units between the inner links.

5. A transmission chain comprising a plurality of cylindrical units, inner links rotative relatively to the cylindrical units, outer links rotative relatively to the inner links and to the cylindrical units and closing the ends of the same, means for connecting the outer links, and wear members bearing around the cylindrical units between the inner links and overlapping the same.

6. A transmission chain comprising a plurality of hollow bearing units, inner links rotative relatively to the bearing units, outer links rotative relatively to the inner links and to the bearing units and closing the ends of the same, means operating through the bearing units for connecting the outer links, and wear members fitting around the bearing units between the inner links.

7. A transmission chain comprising a plurality of outer links coupled in pairs, a plurality of inner links coupled in pairs and rotative relatively to the outer links, a plurality of hollow bearing units rotative relatively to the outer and inner links, means for connecting the outer links, and means for supplying lubricant through certain of the outer links into the interior of the hollow bearing units.

8. A transmission chain comprising a plurality of outer links coupled in pairs, a plurality of inner links coupled in pairs and rotative relatively to the outer links, a plurality of hollow bearing units rotative relatively to the outer and inner links, threaded pins extending into the bearing units through the outer links on one side of the chain, and threaded sleeves extending through the outer links on the other side of the chain and engaging the pins for connecting the outer links.

9. A transmission chain comprising a plurality of cylindrical units, inner links rotative relatively to the cylindrical units, outer links rotative relatively to the inner links and to the cylindrical units and closing the ends of the same, a threaded pin extending through one of the outer links, and a threaded sleeve extending through the other outer link and engaged by the pin, said sleeve having an inwardly opening valve and an oil escape orifice.

In testimony whereof I affix my signature.

JOHN E. BARROWS. [L. s.]

Copies of this patent may be obtained for five cents each, by addressing the "Commissioner of Patents, Washington, D. C."